United States Patent [19]

Flynn

[11] 4,187,875

[45] Feb. 12, 1980

[54] LIQUID DETERGENT RESERVOIR

[75] Inventor: Eugene R. Flynn, Farmington Hills, Mich.

[73] Assignee: Manville Manufacturing Corporation, Pontiac, Mich.

[21] Appl. No.: 824,520

[22] Filed: Aug. 15, 1977

[51] Int. Cl.[2] .............................................. F16K 19/00

[52] U.S. Cl. ..................................... 137/576; 137/590; 222/464; 261/78 A

[58] Field of Search ........................ 137/576, 590, 604; 222/193, 464; 239/311, 316, 318; 261/78 A

[56] References Cited

U.S. PATENT DOCUMENTS

| | | | |
|---|---|---|---|
| 2,508,958 | 5/1950 | Manville | 239/464 X |
| 2,652,850 | 9/1953 | Manville | 137/218 |
| 2,691,510 | 10/1954 | Manville | 261/78 A |
| 3,044,575 | 7/1962 | Ferguson | 261/78 A X |

FOREIGN PATENT DOCUMENTS

| | | | |
|---|---|---|---|
| 795177 | 9/1968 | Canada | 222/464 |

*Primary Examiner*—Robert G. Nilson

*Attorney, Agent, or Firm*—Woodard, Weikart, Emhardt & Naughton

[57] ABSTRACT

A reservoir for retention and delivery of a liquid detergent and water mixture includes an upright standing, multiwalled main body portion, a vertical duct having a passageway therethrough and a hollow outlet tube. The reservoir is constructed of a single molded piece of plastic and the main body portion includes a bottom wall and four side walls which adjoin one another to define an open cavity. The outlet tube which extends through one side wall connects to the vertical duct and opens into the passageway. The free end of the outlet tube is of a design which allows sealing engagement of the outlet tube with a suction conduit. There is a small aperture through the wall of the vertical duct, adjacent to the bottom wall of the main body portion. This aperture provides a path for a liquid detergent and water mixture to flow from within the open cavity into the passageway of the vertical duct. In response to a suction force on the end of the hollow outlet tube, detergent and water mixture flowing into the passageway is able to flow into and through the hollow outlet tube and then into the suction conduit for delivery of this liquid mixture to a remote location.

5 Claims, 5 Drawing Figures

LIQUID DETERGENT RESERVOIR

BACKGROUND OF THE INVENTION

1. Field of the Invention

This invention relates in general to liquid reservoirs and in particular to reservoirs which retain liquid detergent and are able to deliver such detergent in response to a suction force.

2. Description of the Prior Art

Liquid reservoirs of the general character of this invention have been heretofore employed in various capacities wherein it is desired to draw liquid from a receptacle by suction. Often the material being withdrawn is in a reduced quantity such as a lubricant device for internal combustion engines and particularly for introducing a minute quantity of liquid detergent into a water stream of a dishwashing apparatus of the character disclosed in U.S. Pat. No. 2,652,850 issued Sept. 22, 1953 to Manville and assigned to the assignee of the present application.

Attempts have been made to simplify the design of such devices so that the construction will be less costly without decreasing the reliability or effectiveness. U.S. Pat. No. 2,691,510 issued Oct. 12, 1954 to Manville and assigned to the assignee of the present invention discloses one such device. The device of U.S. Pat. No. 2,691,510 utilizes a liquid detergent reservoir and a U-shaped copper tube through which a detergent and water mixture is drawn by means of suction through a connecting conduit. Although the device described represents a fairly basic construction, the copper tube will eventually corrode after prolonged exposure to various chemicals and in particular to dishwashing detergent solutions.

SUMMARY OF THE INVENTION

A reservoir according to one embodiment of the present invention comprises a main body portion, a duct and a hollow outlet tube. The main body portion is open at the top and has a bottom wall and side walls which define a cavity within the main body portion. The duct is integrally molded as part of the main body portion and extends upwardly from the bottom wall to the open top. This duct has a passageway extending the full length therethrough. The hollow outlet tube is joined at one end to the duct and opens into the passageway. The outlet tube extends through a side wall and is of a design which permits the tube to sealingly engage a connecting suction conduit. The duct has an aperture therein adjacent to the bottom wall of the main body which provides a path for fluid to flow from the cavity into the passageway.

One object of the present invention is to provide an improved liquid receptacle.

Related objects and advantages of the present invention will be apparent from the following description.

DESCRIPTION OF THE PREFERRED EMBODIMENT

Figure 1:
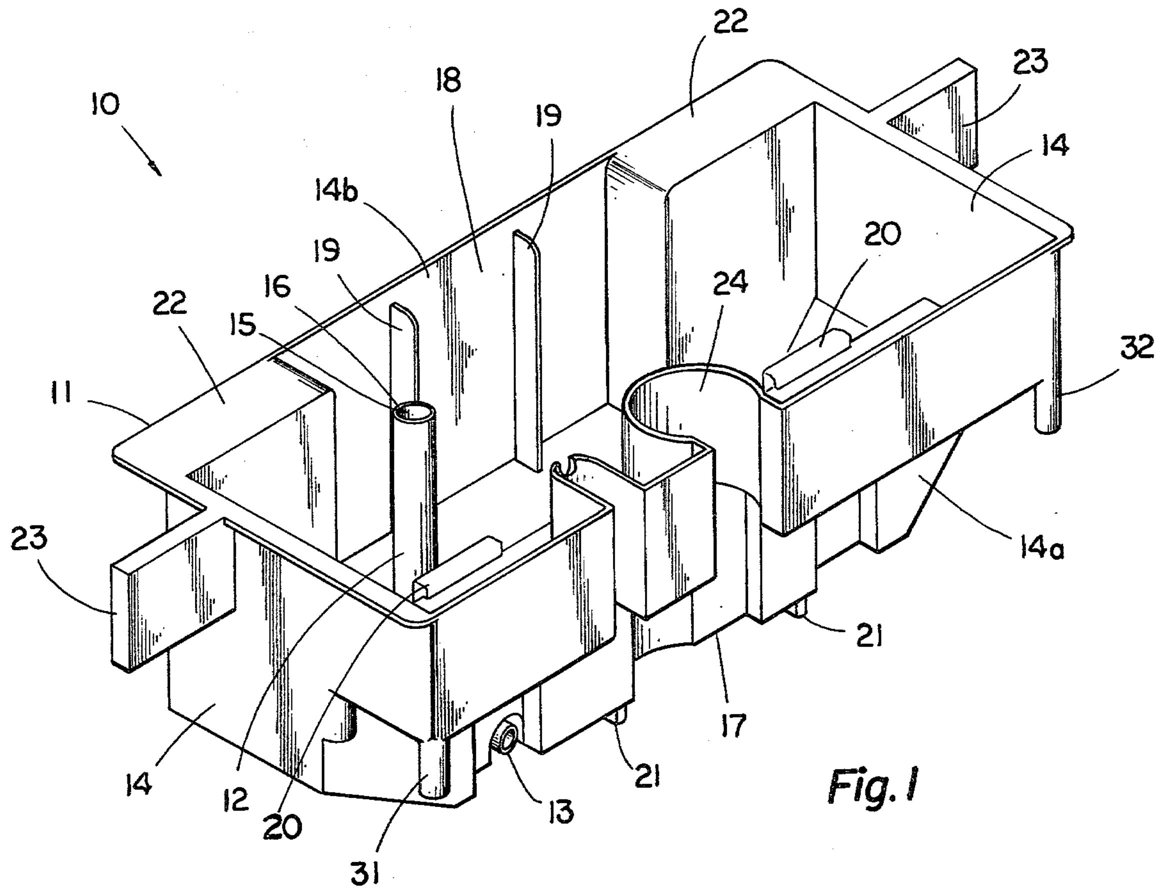
FIG. 1 is a perspective view of a liquid detergent reservoir according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, liquid detergent reservoir 10 is shown comprising a main body portion 11, a vertical duct 12 and a hollow outlet tube 13. Liquid detergent reservoir 10 is constructed of plastic as a single integral unit and is molded into the configuration shown. The main body portion 11 is constructed of five irregularly shaped surfaces including two side walls 14, a front wall **14*a*, a rear wall 14*b* and a base or bottom wall 17. Bottom wall 17, side walls 14, front wall 14*a* and rear wall 14*b* are joined to each other such that their joined combination defines a cavity 18 which is open at its top. Molded as part of the walls of main body portion 11 are ribs 19 and bosses 20 which provide structural support for the molded receptacle. Although constructed of plastic, and being somewhat flexible, the inclusion of ribs 19, bosses 20 and other structural surfaces such as shoulder portion 22 and tabs 23 permit reservoir 10 to be self-supporting and free standing in an upright position. Reservoir 10 is supported in this upright position by legs 21 which are molded as part of the exterior surface of bottom wall 17. In addition to structural support, some of the molded-in features, such as recess 24**, have other uses which will be described and discussed later.

Figure 4:
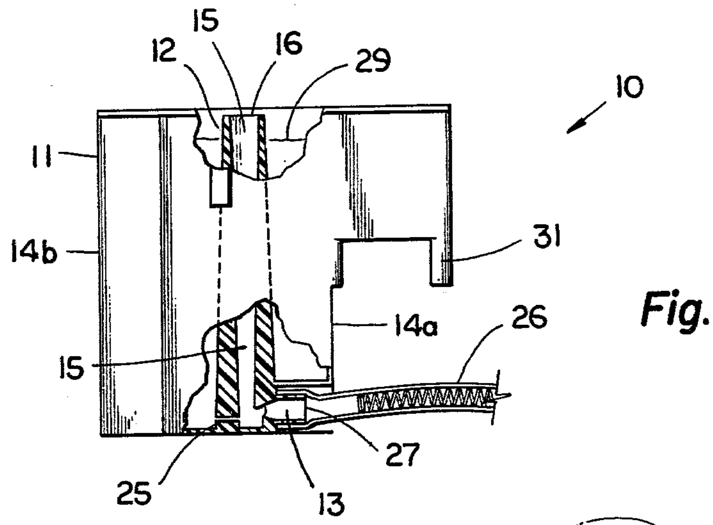
FIG. 4 is a side elevational view of the FIG. 1 liquid detergent reservoir, with portions shown in section to illustrate interior details.

Vertical duct 12 is a hollow, generally cylindrical member which is molded as part of the interior surface of bottom wall 17 and extends upwardly from bottom wall 17 to the open top of reservoir 10. A passageway 15 extends from the open exposed end 16 of vertical duct 12 to the bottom wall 17. An aperture 25 (see FIG. 4) passes through the wall of duct 12 and joins with passageway 15. The lower edge of aperture 25 is virtually flush with the interior surface of bottom wall 17. Opposite aperture 25 is hollow outlet tube 13 which is molded as part of bottom wall 17 between cylindrical duct 12 and front wall **14*a*. Outlet tube 13 has a hollow, generally cylindrical center which opens into passageway 15**.

Figure 2:
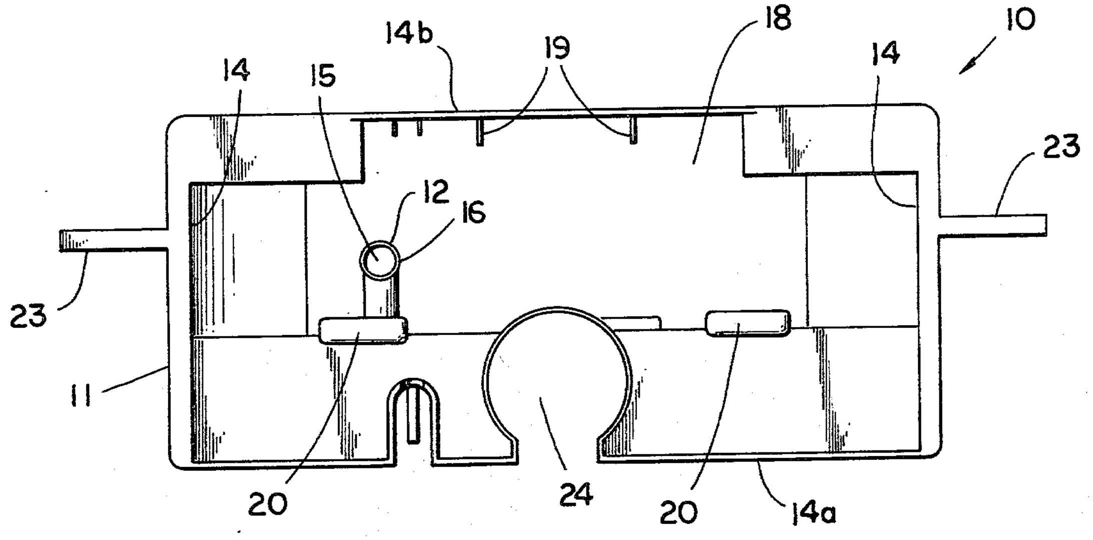
FIG. 2 is a plan view of the FIG. 1 liquid detergent reservoir.
Figure 3:
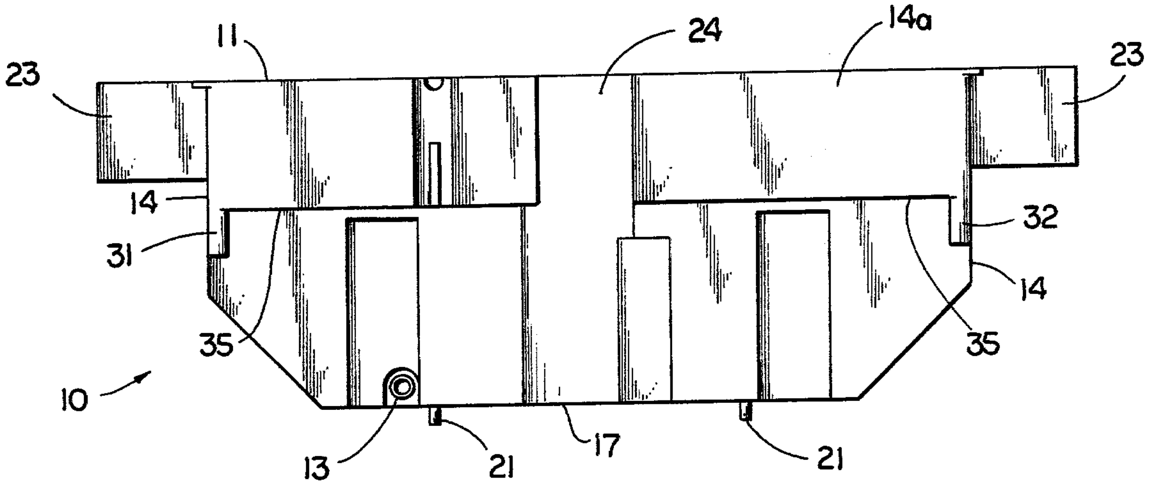
FIG. 3 is a front elevational view of the FIG. 1 liquid detergent reservoir.

FIGS. 2 and 3 are a plan view and front elevational view, respectively, of reservoir 10 and are included for additional understanding of the detailed design of the single-piece, molded construction of reservoir 10.

The end of hollow outlet tube 13 is so constructed that it is able to be sealingly fitted with a flexible suction conduit 26 of the type disclosed in U.S. Pat. No. 2,691,510 and which is associated with the dishwashing apparatus disclosed in U.S. Pat. No. 2,652,850. Prior to using the disclosed dishwashing apparatus, a measured amount of liquid detergent is placed in the open cavity 18 of the liquid detergent reservoir 10 and the remainder of this cavity is then filled with water up to a liquid level indicated by line 29. Inasmuch as aperture 25 is open and connects the open cavity 18 to vertical duct 12, the liquid detergent and water mixture will be able to seek its own level in both cavity 18 and duct 12.

The dishwashing apparatus of U.S. Pat. No. 2,652,850 incorporates a fountain brush, a control button, and a diverter valve for diverting water from the usual discharge faucet spout to the fountain brush. Also coupling to this fountain brush is a flexible conduit, such as conduit 26, which attaches to an associated liquid detergent reservoir, such as reservoir 10. Once at least one of the faucet valves have been turned on to establish a stream of water through the faucet spout, lifting up on the knob of the diverter valve diverts the flowing water to flow through the fountain brush. Due to the internal design of the fountain brush, the flow is through a venturi and a partial vacuum is developed. As the control button, which is positioned on the fountain brush, is selectively depressed, a suction force due to the partial vacuum is created on one end of flexible conduit 26. With the other end of the conduit attached to outlet tube 13 of reservoir 10, the suction force will act on the end of outlet tube 13 and, in turn, on the liquid detergent and water mixture within reservoir 10, thereby delivering the mixture to the fountain brush.

It should be noted that the object of the design of reservoir 10 is not merely to provide a receptacle for the retention of liquid detergent for use with the dishwashing apparatus of U.S. Pat. No. 2,652,850, but is to provide a reservoir design which is capable of delivering a mixture of air and liquid detergent (diluted with water) to the fountain brush. Initially, when suction is applied to conduit 26, due to the venturi action, the liquid detergent and water mixture within passageway 15 of vertical duct 12 will be drawn out through hollow outlet tube 13, but there will not be any air blended with this liquid mixture in the reservoir until such time that the liquid level within passageway 15 drops from the level indicated by line 29 to a level even with aperture 25.

A major portion of the liquid which initially flows into conduit 26 when the button is pushed, comes from vertical duct 12, although a small amount of liquid may also come from cavity 18 through aperture 25. Flow from vertical duct 12, through outlet tube 13 and into suction conduit 26 is virtually unrestricted while any liquid flowing from cavity 18 must pass through aperture 25 whose open diameter is quite small. A typical value for the diameter of vertical duct 12 is 0.351 inches at the top and 0.158 inches at the bottom, there being draft in the hole to facilitate molding. A typical value for the diameter of aperture 25 is 0.060 inches. Therefore, when the button is pushed, liquid contained within vertical duct 12 will be promptly emptied, during which time there will be only a negligible drop in the liquid level of cavity 18. Once duct 12 is empty, further liquid which is to be drawn from reservoir 10 must come entirely from open cavity 18 by way of aperture 25. Once the liquid level in vertical duct 12 drops to the level of aperture 25, continued suction force from the venturi action within the fountain brush as applied to conduit 26 will draw a metered amount of liquid detergent mixture through aperture 25 and a complementing amount of air through the open exposed end 16 of vertical duct 12. The delivery to the fountain brush of liquid detergent (and water) mixed with air resulting in the apparent development of suds, will continue in response to the continued depression of the control button until such time as the button is released. Eventually, liquid mixture within cavity 18 is exhausted. At this point, the reservoir 10 must be refilled with the mixture of liquid detergent and water. An objective in sizing of duct 12 and aperture 25 is to enable the user to wash dishes without waste of detergent, and yet have an adequate initial flow for quick cleaning action. In this way, good performance is achieved for several dishwashing sessions, without the need to refill the reservoir.

Figure 5:
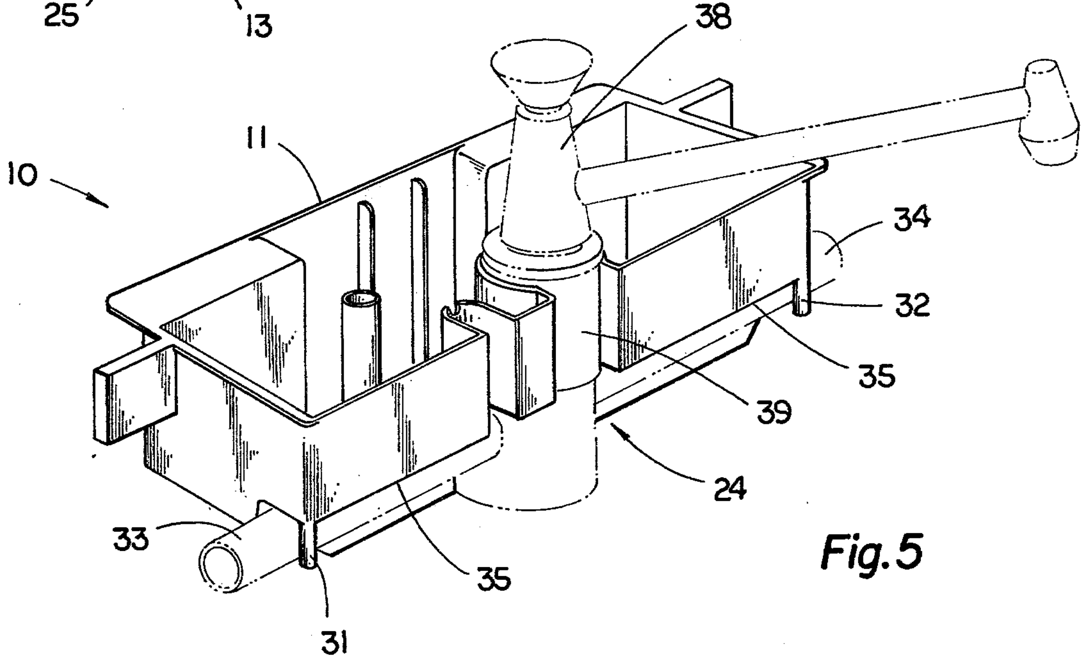
FIG. 5 is a perspective view of the FIG. 1 liquid detergent reservoir positioned within a faucet assembly.

FIG. 5 is a perspective view of reservoir 10 shown positioned as part of a suitable dishwashing apparatus. However, only the faucet control valves and riser for the faucet spout are actually shown. It is to be understood that these members comprise a portion of a dishwashing apparatus generally as disclosed in U.S. Pat. No. 2,652,850. As shown, stem-like protuberances 31 and 32 fit over the hot water manifold 33 and the cold water manifold 34, respectively. Mainfolds 33 and 34 lie beneath shelf 35 as they extend toward riser fitting 38 of the faucet assembly. Recess 24, which is part-cylindrical in cross-sectional shape, fits around the reduced portion 39 of the riser fitting 38. As has been previously described, reservoir 10, although rigid enough to be upright and free standing, is also flexible so that reservoir 10 can be fitted around and over the various faucet and manifold members, yet still be removable therefrom. This permits reservoir 10 to be readily removed and replaced in the event it becomes contaminated, clogged, or otherwise impaired by the user filling it with improper materials. An example would be hand lotion instead of detergent. The corrosion problem of the prior art is eliminated. Reservoir 10 can be installed and will be relatively secured in place without the need for mounting hardware. Reservoir 10 will also not be subject, once in place, to significant movement or to being turned over which would cause the liquid detergent mixture to spill.

The preferred material for the reservoir is "Tenite No. 5321-A" high impact polyallomer available from the Plastics Division, Eastman Chemical Products, Inc., Kingsport, Tenn.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A liquid detergent reservoir for the retention and delivery of liquid detergent mixture which comprises:

a main body portion open at the top and having a bottom wall and side walls providing a bottom surface and sides respectively defining a cavity within said main body portion;

an air intake duct integrally a part of said main body portion and extending upwardly from the bottom surface to the open top, said duct having a passageway therethrough;

a hollow outlet tube integrally a part of said main body portion and opening at one end into said duct, said hollow outlet tube outwardly extending beyond one of said walls;

said duct having an aperture therethrough in said cavity adjacent the bottom surface of said main body portion, said aperture providing a path for fluid to flow from said cavity into said passageway;

said reservoir being of a single piece, molded plastic construction;

said side walls including upwardly extending elongate structural support features whereby said reservoir is structurally configured such that the reservoir is self-supporting in an upright, free-standing manner;

one of said sides being molded with a part cylindrical recess adapted to fit around a riser fitting of a dishwashing apparatus and being adapted with an offset shelf to fit over hot and cold manifold pipes connecting to said riser of said dishwashing apparatus.

2. The reservoir of claim 1 in which said hollow outlet tube is of a design which permits sealing engagement to a suction conduit.

3. The reservoir of claim 2 in which the fluid retaining capacity of said main body portion is less than 20 fluid ounces.

4. The reservoir of claim 3 in which said aperture is between 1/32 and 3/32 inches in inside diameter.

5. The reservoir of claim 3 in which said duct passageway is tapered and is between $\frac{1}{8}$ and 1/5 inches in diameter at one end and between $\frac{1}{3}$ and 2/5 inches in diameter at the other end.

* * * * *